Patented Oct. 13, 1936

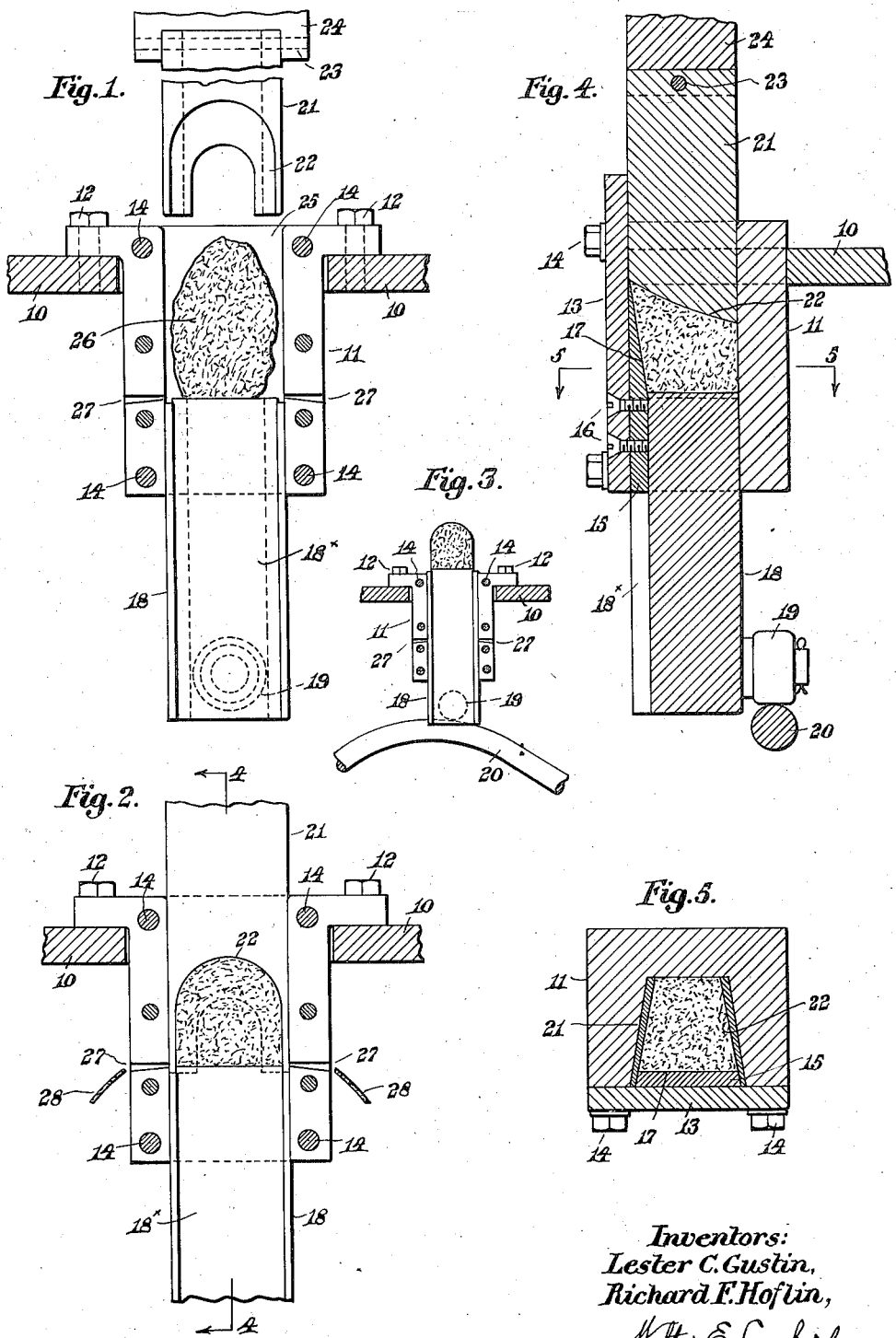

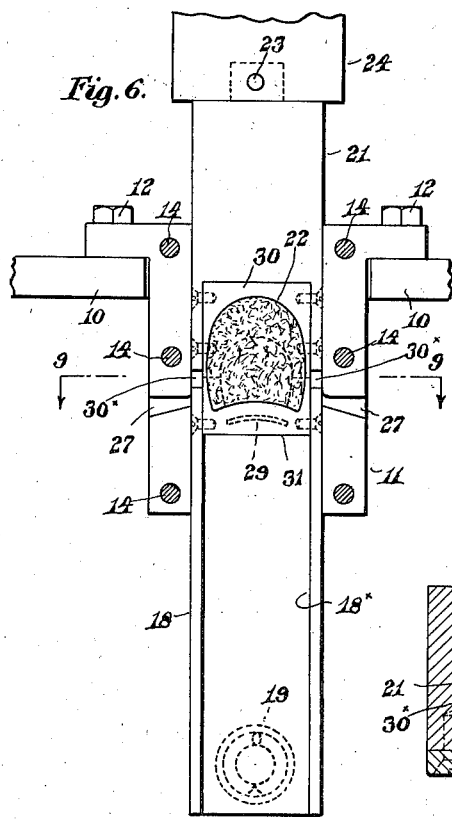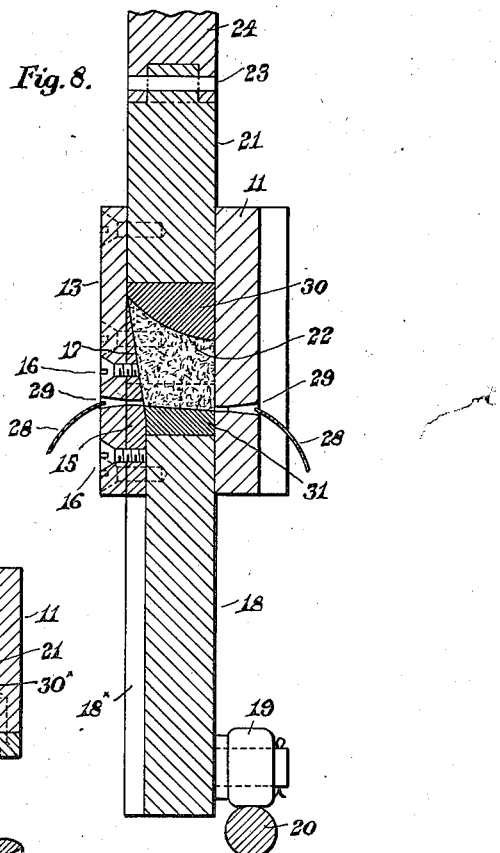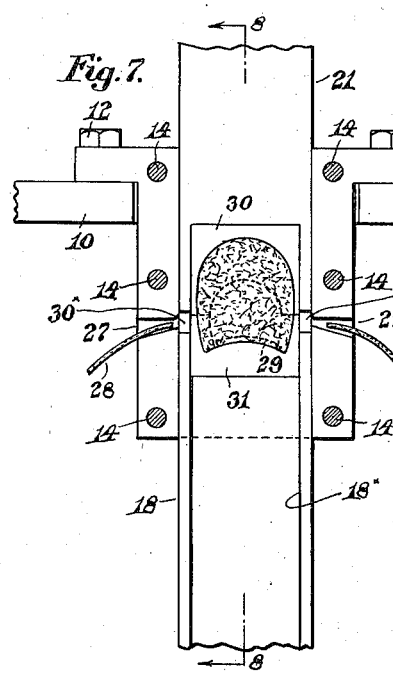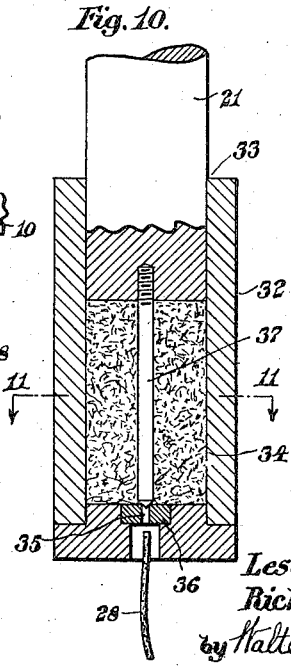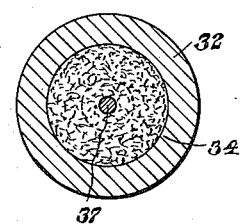

2,057,377

UNITED STATES PATENT OFFICE 2,057,377

MOLDING MECHANISM

Lester C. Gustin, Winchester, and Richard F. Hoflin, North Randolph, Mass., assignors to Harold G. Storke, Arlington, Mass., trustee Application May 14, 1934, Serial No. 725,488
Renewed March 16, 1936

20 Claims. (Cl. 18—16)

This invention relates to molding mechanism and particularly to a two part mold adapted to be attached to a molding press and give a direct pressure to a molding composition, and subsequently impart a flowing pressure to the particles of said composition, thereby attaining a greater adhesion of said particles to each other.

The object of the invention is to produce by compression and rubbing or flowing action a molded article having great strength and rigidity.

This object is attained by the mechanism illustrated in the accompanying drawings.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawings:

Figure 1 represents an elevation of a mold embodying the principles of the present invention, the cover plate being cut away and the plunger being shown in loading position.

Figure 2 represents a similar elevation with the plunger in lowered position.

Figure 3 represents a similar elevation of the ejector raised by a cam member and in position to eject a molded article from the housing.

Figure 4 represents a vertical section on line 4, 4 on Fig. 2.

Figure 5 represents a horizontal section on line 5, 5 on Fig. 4

Figure 6 represents an elevation of a modification of said mold, the cover plate being cut away.

Figure 7 represents a similar elevation with plunger and ejector in position to mold an article.

Figure 8 represents a vertical section on line 8, 8 on Fig. 7.

Figure 9 represents a horizontal section on line 9, 9 on Fig. 6.

Figure 10 represents vertical section of a modified form of mold for forming cylinders, and Figure 11 represents a section of same on line 11, 11 on Fig. 10.

Similar characters indicate like parts throughout the several figures of the drawings.

In the drawings, 10 is a portion of a frame having a housing 11 secured thereto by bolts 12.

This housing 11 has a cover 13 secured thereto by bolts 14.

The cover 13 has secured to its inner face a plate 15 by means of screws 16, the upper inner face of said plate 15 being inclined as shown at 17 in Fig. 4 of the drawings.

This inclined face may be flat as indicated in Fig. 5 of the drawings, or it may be shaped otherwise according to the article to be molded.

Disposed in the lower end of the housing 11 is a slidable ejector 18 having at its lower end a roller 19 which is adapted to coact with a cam member 20 movable beneath said roller and forming a part of a molding machine.

The ejector 18 has a depression 18x in one face into which projects the plate 15 accurately filling said depression.

This molding machine may be of any well known construction and requires no illustration.

Above the housing and alined with the ejector 18 is a plunger 21 having at its lower end a chambered recess 22 shaped to form a shoe heel.

The plunger 21 is secured at 23 to a vertically movable member 24 forming a part of the molding press and to which power may be applied in any well known manner to move the plunger downwardly and compress the molding composition.

In the housing 11 is a loading cavity 25 in which is adapted to be disposed a lump 26 of dough formed from a molding composition.

This composition is preferably composed of an inert filler in a solution containing a gummy adhesive, celluloid and drying oil, although it may be formed from an inert filler in a solution containing a gummy adhesive and celluloid, or an inert filler in a binding solution.

The ingredients of the composition are combined in such proportions and in such a manner that adhesion between the particles thereof takes place by means of a direct pressure followed by a flowing or rubbing action.

By varying the proportions of the ingredients and the manner of mixing the same, the consistency of the molding composition can be varied from that of warm tar to that of a moist powder.

This composition may be poured, shaken, dropped, ejected under pressure, or forced by mechanical means into the loading cavity 25 and this cavity its preferably one and one-half to two times the volume of the finished article to be molded, this variation being according to the density of the molding composition used.

The molding cavity 22 in the bottom of the plunger 21 conforms to the shape of the finished molded article and may be formed in one piece or several pieces according to the shape of the article to be molded and the way it is to be ejected from the mold.

The plunger 21 in the operation of the molding mechanism passes through the loading cavity 25, pushing or forcing the loading charge 26 of the molding composition ahead of it and forces this composition into the various curves and contours of the molding cavity 22.

The bottom of the plunger having the molding cavity 22 therein usually forms one face of the molded article and its downward movement is adjusted so that its stroke finishes at the point where this upper face of the molded article is formed.

In the housing 11 and at the bottom of the loading cavity 25 are laterally extending overflow openings 27.

These overflow openings 27 may be of various sizes and shapes depending on the consistency of the molding composition, the flowing pressure of the dough or powder, the power or amount of pressure exerted by the plunger, the speed at which the plunger 21 is operating, the amount of excess material to be forced through the overflow openings 27 to obtain the desired adhesion and the size and shape of the article to be molded.

The overflow may be through one or more openings 27, the essential feature being that the molding material must be forced through these overflow openings 27 under pressure and that said overflow continue through these openings in an unbroken ribbon or flow 28 until the molding operation is completed and the pressure released or until the overflow opening is closed by mechanical means prior to the final completion of the molding stroke of the plunger 21.

In Figs. 6, 7 and 8, the surplus material is ejected through the openings 27 prior to the completion of the downward stroke of the plunger 21, these openings then being closed by the plunger 21 and the final discharge of any remaining material being through openings 29 which are located at points where the plunger 21 reaches the limit of its downward stroke.

In other words, the overflow openings 27 may remain open at all times during the molding operation as shown in Fig. 1, or these overflow openings 27 may be opened mechanically when the pressure of the molding composition has reached a certain point, or they may be open at the beginning of the molding process and closed mechanically just before the process is completed, as shown in Fig. 6.

These overflow openings 27 may also be opened mechanically when the pressure on the molding operation has reached a certain point and closed mechanically just before the process is completed.

The one essential feature of the invention, however, is that at some time during the actual molding process, the molding composition must be allowed to flow in unbroken streams or ribbons 28 through the overflow openings 27 while under pressure created by the movement of the plunger 21.

This permits a compression of the molding material by direct pressure and then a rubbing or flowing action which will cause the particles of the composition to flow in different directions in the molding cavity 22 rubbing against each other and thus producing an adherence between the particles which give the finished article a greater rigidity and strength.

The ejector 18, which is movable, is adapted to be moved upwardly by the cam member 20 when the molded article is to be ejected from the mold.

The upper surface of this ejector 18 forms a lower face or a portion of the lower face of the molding cavity 22 opposite the upper face of the molding cavity 22 formed by the plunger 21.

During the molding of the article, the ejector 18 is in position to form the lower part of the face of the molding cavity 22 except in such cases where it is desired to have the molding composition subjected to a pressure higher than the pressure of flow, in which case the ejector is raised or forced forward so it may act as a valve to cover the overflow openings 27 and held in that position by a pressure equal to that by which the molding composition is to be subjected before it is allowed to flow.

When this pressure is reached during the molding operation, the pressure forces the ejector 18 to its extreme lower position, thus uncovering the overflow openings 27 and allowing the rubbing action of the molding composition to take place.

When the molding has been completed the ejector 18 is raised and the molded article lifted from the molding cavity 22 up through and beyond the loading cavity 25 to a point from which it may be removed from the housing 11.

The housing 11, which acts as a support for the moving parts 21, 18 and encloses the same, is attached to the support 10 of the machine proper when the molding is being done by machine.

In Figs. 1 to 5 a mold is shown adapted for molding an unfinished heel block, while in Figs. 6 to 9 inclusive is shown a mold adapted to mold a finished heel, members 30 and 31 being inserts secured respectively in the plunger 21 and the ejector 18.

The member 30 extends below the lower end of the plunger 21 and the member 31 extends above the upper end of the ejector 18, thereby leaving a space $30x$ between the plunger 21 and the ejector 18, as shown in Figs. 6 and 7 of the drawings.

These members 30, 31 may have their inner faces so shaped as to produce during the molding operation any desired shape of heel or other article.

By providing the members 30, 31 the size and shapes of the molded articles may be varied without making it necessary to have an individual mold for every size and shape of molded article.

At the start of the molding operation in the modification shown in Figs. 6 to 9 inclusive, the top of the ejector 18 is at a point above the position shown in these figures, thereby closing the overflow openings 27.

When the pressure in the molding cavity 25 caused by the downward movement of the plunger 21 reaches a standstill, the ejector 18 is forced downwardly so as to uncover the overflow openings 27 and allow the molding composition to flow therethrough.

By such a construction the overflow openings 27 are opened mechanically at a given pressure after the molding operation has started.

In Figs. 10 and 11, a mold 32 is shown adapted for molding cylinders.

In this case a loading cavity 33 and the molding cavity 34 are continuous with the overflow opening 35 located in the lowest part of the molding cavity 34 which is circular in shape.

The overflow opening is in a removable disk 36 which may be replaced by another disk having a larger or smaller overflow opening 35 therein.

The plunger 21 in this case has a dowel 37 secured to the lower end thereof having a tapered lower end which fits into the overflow opening 35 and closes the same when the plunger is in its lowest position, thus acting as a valve to shut off the overflow.

The dowel 37 may be unscrewed from the plunger 21 and another dowel substituted therefor having a different diameter.

By this construction cylinders having bores of various diameters may be molded which will have great strength and rigidity.

Having thus described our invention, we claim:

1. A mold for molding plastic compositions comprising a housing having molding and loading cavities therein, and a plunger by which the composition is subjected to direct pressure, said housing having horizontal slits forming outlet or overflow openings through which some of the composition is ejected under and prior to the completion of pressure during the molding operation.

2. A mold for molding plastic compositions comprising a housing having molding and loading cavities therein, and a plunger by which the composition is subjected to direct pressure, said housing having horizontal slits forming outlet or overflow openings through which some of the composition is ejected under pressure during one part of the molding operation and prior to the completion of said operation, said housing having other overflow openings uncovered at the completion of the downward movement of said plunger.

3. A mold for molding plastic compositions comprising a housing having molding and loading cavities therein, and a plunger by which the composition is subjected to direct pressure, said housing having two sets of lateral outlet or overflow openings in the walls thereof through one set of which some of the composition is ejected under pressure during the molding operation and through the other set of which surplus material may be ejected at the end of the downward stroke of said plunger.

4. A mold for molding plastic compositions comprising a housing having molding and loading cavities therein, and a plunger by which the composition is subjected to direct pressure, said housing having outlet or overflow openings through which a limited amount of the composition is ejected under pressure during and prior to the completion of the molding operation thereby causing adhesion to take place by the particles of the composition remaining in the molding cavity to rubbing or flowing against one another.

5. A mold for molding plastic compositions comprising a housing having molding and loading cavities therein, and a plunger by which the composition is subjected to direct pressure while the end of said plunger is diminishing the volume of said molding cavity, said housing having outlet or overflow openings above the bottom of the molding cavity through which some of the composition is ejected under pressure during and prior to the completion of the molding operation.

6. A mold for molding plastic compositions comprising a housing having molding and loading cavities therein, a plunger by which the composition is subjected to direct pressure, said housing having lateral outlet or overflow openings above the bottom of the molding cavity through which some of the composition is ejected under pressure during and prior to the completion of the molding operation, an ejector by which the molded article is ejected from said housing and having a depression in one face thereof; and a fixed plate extending into said depression with its upper end conforming to one face of the article being molded.

7. A mold for molding a plastic composition comprising a housing having a molding cavity therein, a reciprocable plunger the end of which forms one face of said molding cavity, said housing having lateral overflow openings in the side walls thereof through which limited quantities of the molding composition are ejected while subjected to direct pressure from said plunger; and means for closing said openings prior to the completion of the downward stroke of said plunger.

8. A mold for molding a plastic composition comprising a housing having a molding cavity therein, and a reciprocable plunger the end of which forms one face of said molding cavity, said housing having lateral overflow openings through which limited quantities of the molding composition are ejected while subjected to direct pressure from said plunger and said plunger acting during some part of the molding operation as a valve to close the overflow openings before the molding operation is completed.

9. A mold for molding a plastic composition comprising a housing having a molding cavity therein and provided with overflow openings therefrom, a valve in the molding cavity adapted to close said overflow openings and remain closed until direct pressure on the molding composition reaches a given point and then to move to uncover said overflow openings.

10. A mold for molding a plastic composition comprising a housing having a molding cavity therein and provided with overflow openings, and a reciprocable plunger in said molding cavity to give a direct pressure to the composition, said overflow openings being located opposite a side face of the article being molded and above the bottom of the molding cavity.

11. A mold for molding a plastic composition comprising a housing provided with a molding cavity and having an overflow opening in the bottom thereof, a plunger for imparting pressure to the composition in said molding cavity, and a removable dowel extending downwardly from said plunger adapted to form an opening in the article being molded, the lower end of said dowel acting as a valve to close the overflow opening from said molding cavity at the completion of the molding operation.

12. A mold for molding a plastic composition comprising a housing having a molding cavity therein and provided with overflow openings, and a reciprocable plunger in said molding cavity to give a direct pressure to the composition; and means movable with and forming a part of said plunger for closing said overflow openings for a limited period, then uncovering said openings when the pressure on the composition has reached a predetermined amount, and then again closing the openings prior to the completion of the downward movement of said plunger.

13. A mold for molding a plastic composition comprising a housing having a molding cavity and provided with lateral overflow openings therefrom at points above the bottom of the molding cavity, a reciprocable plunger in said molding cavity to give a direct pressure to the composition, a reciprocable ejector in said housing, and inserts in said ejector and plunger having oppositely disposed shaped faces for molding the composition, said inserts being adapted to be replaced by other inserts having differently opposed shaped molding faces.

14. A mold for molding a plastic composition comprising a housing having a molding cavity therein and provided in the bottom thereof with interchangeable inserts each having a different sized overflow opening leading from the molding cavity; and a plunger in said housing having a dowel adapted to close said opening at the end of the downward stroke of said plunger.

15. The method of molding a plastic composition in which an excessive amount of the composition is deposited in a molding cavity extending part way into a loading cavity, then subjecting the composition to direct pressure and compression until a certain pressure is reached, at which point a limited amount of the composition is allowed to escape from the molding cavity through an overflow opening while still subjected to pressure, and then closing said overflow opening before the pressure on said composition has been completed.

16. A mold for molding plastic compositions comprising a housing having a molding cavity from which extends an overflow opening above the bottom of said cavity and a slidable member for uncovering said opening for a limited time at an intermediate point in the compression of said composition.

17. A mold for molding plastic compositions comprising a housing having a molding cavity from which extends an overflow opening above the bottom of said cavity and a slidable member for compressing the composition and uncovering said opening for a limited time at an intermediate point in the compression of said composition.

18. A mold for molding plastic compositions comprising a housing having a molding cavity from which extends an overflow opening above the bottom of said cavity, and a slidable compressing plunger closing said opening at one point in its movement.

19. A mold for molding plastic compositions comprising a housing having a molding cavity from which extends an overflow opening above the bottom of said cavity, and a slidable ejecting plunger closing said opening at one point in its movement.

20. The method of molding a composition self-adherent only under pressure accompanied by flowing or rubbing action which comprises confining a batch of such composition in a mold, closing the mold while leaving an escape port of an area very limited as compared with the area of the mold closure, and moving the mold closure under high pressure to compact the composition and cause flowage thereof until a limited portion thereof has flowed under great pressure through said escape port, thereby redistributing under pressure with accompanying flowing or rubbing action the remaining compacted composition into a dense strongly self-adherent article.

LESTER C. GUSTIN.
RICHARD F. HOFLIN.